No. 823,319. PATENTED JUNE 12, 1906.
W. COOPER.
FISHING HOOK.
APPLICATION FILED JULY 13, 1905.
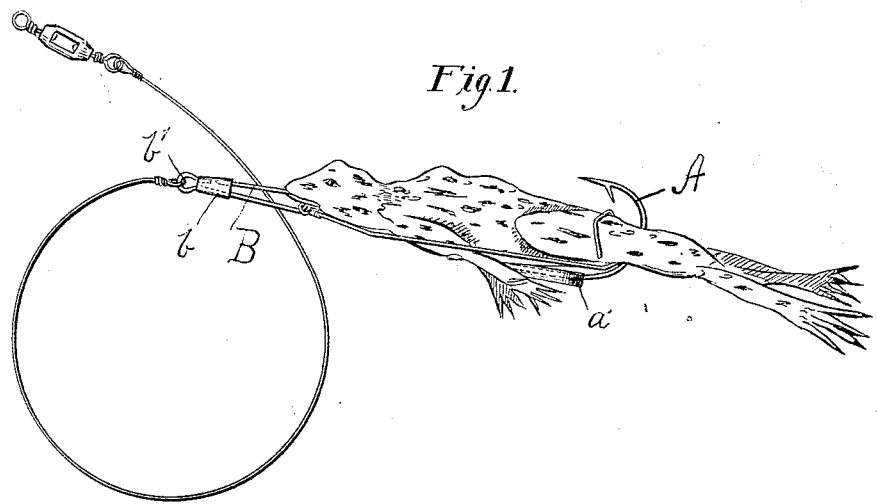
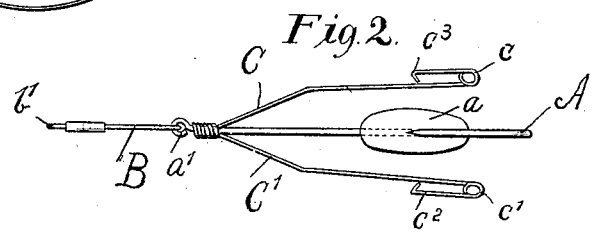
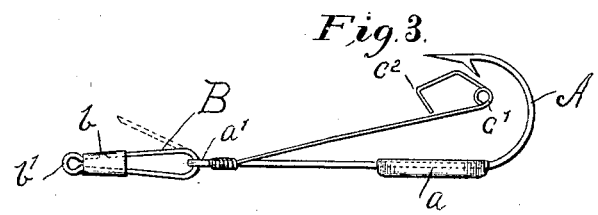
Witnesses:
Chas. F. Bassett
J. M. Weber
Inventor
William Cooper.
By Horace King
atty

UNITED STATES PATENT OFFICE.

WILLIAM COOPER, OF CHICAGO, ILLINOIS, ASSIGNOR OF ONE-HALF TO JAMES COURTLAND COOPER, OF CHICAGO, ILLINOIS.

FISHING-HOOK.

No. 823,319.  Specification of Letters Patent.  Patented June 12, 1906.

Application filed July 13, 1905. Serial No. 269,508.

*To all whom it may concern:*

Be it known that I, WILLIAM COOPER, a citizen of the United States, residing at Chicago, in the county of Cook and State of Illinois, have invented certain new and useful Improvements in Fishing-Hooks, of which the following, taken in connection with the drawings, is a description.

My invention has for its object the production of a hook designed to be used by fishermen when using a frog for bait.

The invention in this instance resides more particularly in the simplicity of the combination and construction, arrangement, and adaptation of the parts, with the added advantage of cheapness in the manufacture of the device.

In the accompanying drawings, forming part of this specification, and in which like letters of reference indicate corresponding parts, I have illustrated one form of device embodying the essential features of my invention, although the same may be carried into effect in other ways without in the least departing from the spirit thereof.

In the drawings, Figure 1 is a side view of my invention, showing the frog attached thereto as in use. Fig. 2 is a top plan view of the device, and Fig. 3 is a side elevation of the same.

In carrying out my invention, A represents a fishing-hook which may be of the ordinary well-known construction, and supported upon the stem of this hook is a sinker $a$. To the eye $a'$ of the hook A is attached a hook or snap B, the end of which is securely held under the guard $b$ when in use. The eye $b'$ may be secured in the usual way to the fish-line. Springs or bait-supports C C' are arranged upon each side of the hook A, being secured thereto near the eye $a'$ and extend outwardly at each side thereof, as shown more clearly in Fig. 2. The wire of which the springs or supports C C' are made is bent into a coil near the outer ends thereof, as at $c\ c'$, the free arms $c^2\ c^3$ of said springs being bent to approximately the position shown in side elevation in Fig. 3, the object being to form a loop in the ends of the spring, which in use will extend over the legs of the frog, and thus retain it in position. As these springs are secured to the hook A they may by bending be raised or lowered to support the frog in any position desired.

In use the snap B, which is made of flexible material, is hooked through the jaw of the frog, preferably as shown in Fig. 1, the body portion of the frog resting on the sinker $a$. The loops $c^2\ c^3$ pass over the hind legs of the frog, the hook A passing upwardly between the legs and over the back of the frog, as shown in Fig. 1. It will thus be seen that I have provided a hook which sustains the frog when used as bait in practically the same position occupied by it in passing naturally through the water.

My improvements are very simple in construction, comprise few parts, can be easily and cheaply manufactured and placed in position, and are effectual in all respects in the performance of their functions.

Slight changes might be made in the details of construction of my invention without departing from the spirit thereof or limiting its scope, and hence I do not wish to limit myself to the precise details of construction herein shown.

I claim—

1. A device of the class described comprising a fish-hook, means for securing the bait thereto, bait-supports secured to the shank of said hook and extending approximately parallel with each side thereof, the ends of said supports adapted to be looped over the bait, substantially as described.

2. In a device of the class described, the combination of a fish-hook, springs upon each side of said hook, said springs having loops upon the free ends thereof, substantially as described.

3. A fish-hook, a bait-engaging device secured to said hook, and springs extending approximately parallel with the shank of said hook upon either side thereof, said springs having loops upon the free ends thereof, substantially as described.

4. A fishing-hook, bait-supports projecting from each side of said hook, coils formed near the free ends of said supports, and engaging devices at the ends of said supports for holding the bait in position, substantially as described.

5. In a device of the class described, the combination of a fishing-hook, a sinker arranged thereon, bait-supports extending from either side of said hook and having means for engaging the bait, and a snap secured to one end of said hook whereby the bait is secured thereto, substantially as described.

6. A hook provided with a bait-engaging device at the shank end thereof, spring-supports extending approximately parallel with each side of the shank of said hook, said supports having loops upon the outer ends thereof, substantially as described.

7. In a device of the class described, the combination of a fish-hook, a bait-engaging device secured to the shank end of said hook, springs upon either side of said hook, said springs having loops upon the free ends thereof, and a sinker upon the shank of said hook, substantially as described.

In testimony whereof I have signed this specification in the presence of two subscribing witnesses.

WILLIAM COOPER.

Witnesses:
J. M. WEBER,
JENNIE L. FISKE.